United States Patent [19]
Webster et al.

[11] Patent Number: 5,602,880
[45] Date of Patent: Feb. 11, 1997

[54] METHOD AND SYSTEM FOR MINIMIZING RESYNCHRONIZATION DELAYS IN DIGITAL MICROWAVE RADIO SYSTEMS

[75] Inventors: Jerry K. Webster, Richardson; Jeffrey L. Zwiebel, Dallas, both of Tex.

[73] Assignee: Alcatel Network Systems, Richardson, Tex.

[21] Appl. No.: 71,468

[22] Filed: Jun. 2, 1993

[51] Int. Cl.⁶ .................................................. H04L 7/00
[52] U.S. Cl. .................. 375/371; 375/354; 375/372; 370/505
[58] Field of Search .................... 375/371, 222, 375/235, 362, 372, 226; 370/102, 108, 105.3, 94.1, 50, 66, 13, 84, 91; 455/51.1, 71, 70; H4L 7/00

[56] References Cited

U.S. PATENT DOCUMENTS

| | | | |
|---|---|---|---|
| 4,266,293 | 5/1981 | Anderson et al. | 370/14 |
| 4,376,998 | 3/1983 | Abbott et al. | 370/13 |
| 4,393,491 | 7/1983 | Ashlock et al. | 379/15 |
| 4,455,661 | 6/1984 | Qureshi | 375/8 |
| 4,803,726 | 2/1989 | Levine et al. | 380/48 |
| 4,866,704 | 9/1989 | Bergman | 370/94.1 |
| 4,965,794 | 10/1990 | Smith | 375/118 |
| 5,077,761 | 12/1991 | Tokunaga | 375/118 |
| 5,121,391 | 6/1992 | Paneth et al. | 370/50 |
| 5,150,386 | 9/1992 | Stern et al. | 375/118 |
| 5,241,543 | 8/1993 | Amada et al. | 370/100.1 |
| 5,263,057 | 11/1993 | Nawrocki | 375/118 |
| 5,390,180 | 2/1995 | Reilly | 370/84 |
| 5,404,394 | 4/1995 | Dimolitsas et al. | 379/100 |
| 5,446,726 | 8/1995 | Rostoker et al. | 370/17 |

*Primary Examiner*—Kim Vu
*Assistant Examiner*—Madeleine Anh-Vinh Nguyen
*Attorney, Agent, or Firm*—Baker & Botts, L.L.P.

[57] ABSTRACT

A method and system is provided for minimizing resynchronization delays in a digital microwave radio system by, immediately upon detecting a signal degradation such as a loss of signal or an out-of-specification signal at any one of a series of digital microwave radio transmitters, setting the transmitter's elastic buffer to an average condition and thereby minimizing frequency offsets at all downstream transmitters and receivers during the degradation period.

13 Claims, 5 Drawing Sheets

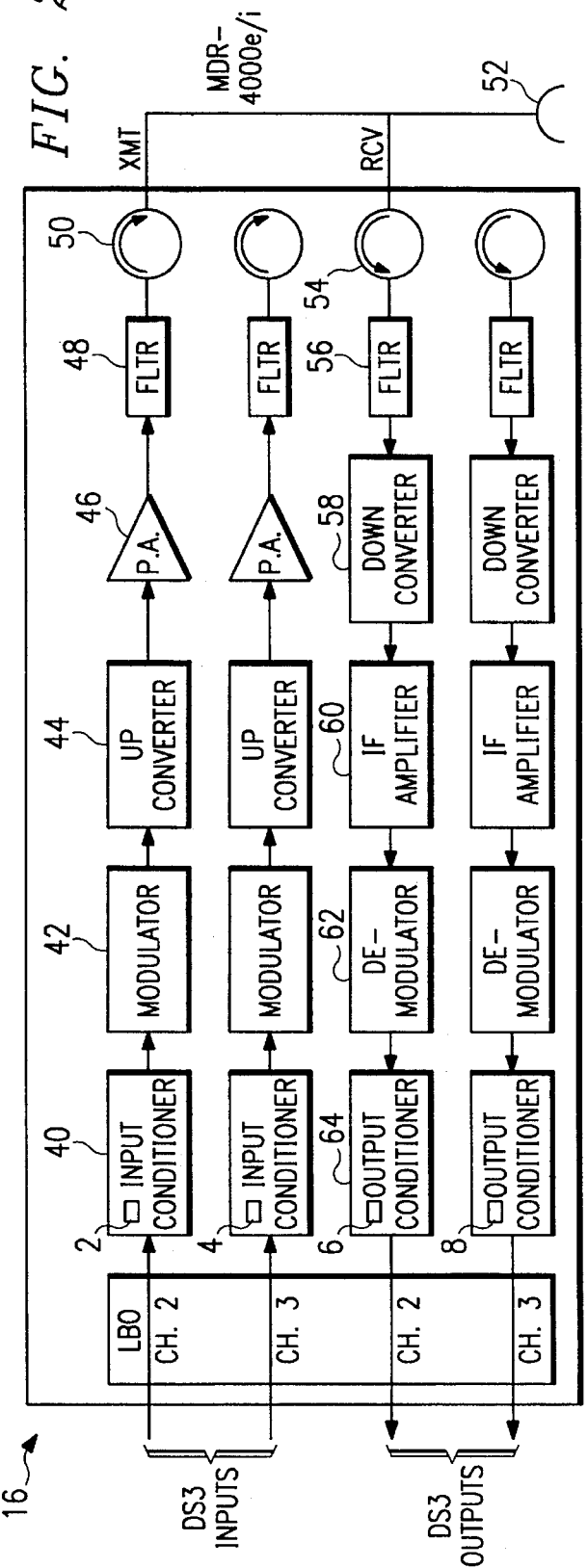

METHOD AND SYSTEM FOR MINIMIZING RESYNCHRONIZATION DELAYS IN DIGITAL MICROWAVE RADIO SYSTEMS

TECHNICAL FIELD OF THE INVENTION

The present invention is concerned generally with electronics, and more specifically with telecommunications systems. Even more specifically, the invention is concerned with a method and system for minimizing resynchronization delays in a digital microwave radio system by, upon detecting a signal degradation such as a loss of signal or an out-of-specification signal at any one of a series of digital microwave radio transmitters, setting the transmitter's elastic buffer and data rate to an average condition and thereby minimizing frequency offsets at all downstream transmitters and receivers during the degradation period.

BACKGROUND OF THE INVENTION

Digital microwave radio systems are designed to carry large volumes of communications signals over relatively long distances. Known designs for long distance digital microwave radio systems use multiple sets of transmitters and receivers, such as in the MDR 4000 e/i digital microwave radio terminals manufactured by Alcatel Network Systems, Inc., to transport the communications signals from one location to another. Known digital microwave radio systems include terminals at each end of the system, and may include terminals in between that are called "repeaters". Such systems are known as "multiple hop" digital microwave radio systems.

Known digital microwave radio transmitters use quadrature modulation techniques, such as QAM, QPSK or QPR modulation, to compress a high bit rate data input signal into a relatively small RF channel bandwidth for transmission. Such transmitters radiate two RF signals modulated in quadrature, or 90° out of phase. Multiple channel digital microwave radio systems are known as "multiline" systems. A multiline system consists of two or more working channels, with one channel for path and equipment protection. Digital switching terminals ("DSTs") are used at each end of the system to accomplish the protection switching.

Digital microwave radio systems commonly use phase-lock loops in each transmitter and receiver for precise and stable tuning of the RF channel frequencies and smoothing of the received communications signals. In a known configuration, which will be described in detail below, an elastic buffer is included in the signal conditioning path of each transmitter and receiver. The transmission rate of the communications signal read out of the elastic buffer is used effectively to control the transmitters' output signal data rates and smoothing of the signals at the receivers' signal conditioning stages. As long as "in-specification" data signals are present in each communications channel, the transmit and receive elastic buffers remain "centered" (e.g., the buffers are half-full), and the signals are transmitted and received with minimal frequency offset errors. However, during signal degradation periods experienced at a transmitter such as, for example, when the flow of communications is disrupted or the quality of the transported signals is degraded significantly ("out-of-specification"), each downstream receiver's elastic buffer wanders "off-center" and effectively detunes the respective receiver. Consequently, upon the return of an in-specification signal, a significant time will pass before each of the downstream receiver's elastic buffers can realign to their "centered" positions. Therefore, the receivers experience significant retuning and resynchronization delays, which results in an extended recovery delay for the overall system. Such recovery delays can vary dramatically and depend upon the bandwidths of the downstream receivers' conditioning loops and the number of hops encountered in the system. Essentially, the recovery delays and concomitant frequency errors at the receivers are additive at each "hop" in a multiple hop system.

A known design attempts to reduce receiver resynchronization time delays that occur after a loss of frame. Upon detecting a loss of frame at a receiver, the receiver inserts an alarm indication sequence (AIS) signal at the receiver output. Consequently, the AIS signal serves as the clock signal for the write side of the elastic buffer in the subsequent transmitter, in an attempt to keep the downstream elastic buffers centered. However, by the time a loss of frame is detected at a receiver, that channel's tuning is already too far off frequency to achieve a relatively rapid realignment. Moreover, for some encrypted communications applications, a data signal is transmitted without framing. Consequently, the above-described AIS solution would not be useful for such an application.

The recovery times for digital microwave radio receivers are designed to comply with the Bellcore TR-TSY-000752 Microwave Digital Radio Systems Criteria, which requires that such receivers realign or resynchronize to the nominal frequency within an average time of less than 50 msec per switch. However, in a known multiline switching application using standard DS3 terminals and repeaters, such a requirement is difficult to meet. For example, when switching a DS3 signal to a protection channel in a DS3 transmitter, the DS3 signal is not present in the channel for about one msec, which is the transit time of the switching relay. During the switching period, the elastic buffers in that terminal's transmitter and receiver wander completely off-center, which results in a large frequency error in the signal at the terminal's output. That error is compounded at each DS3 repeater encountered in the system. Consequently, in such an application, the Bellcore resynchronization criteria is difficult, if not impossible, to meet. Additionally, most DS3 receivers use a simple ringing tank circuit to recover the transmit clock signal from the DS3 signal, which is used for frame resynchronization at the transmitter. Therefore, during the one msec switching period, the transmit clock signal is missing and the received frames cannot be synchronized. Furthermore, the circuit that is used to detect a loss of frame at the transmitter also requires a transmit clock signal to operate, but the clock signal is missing along with the loss of frame. Consequently, no indication is given to the system that a loss of frame has occurred.

It is an object of the present invention, therefore, to provide a method and system that, upon detecting a signal degradation such as a loss of signal or an out-of-specification signal at a digital microwave radio transmitter, sets the read and write counters of the transmitter's elastic buffer to a nominal offset (centers the buffer), and signals the transmitter to operate at the nominal frequency of a normal incoming data signal. Therefore, the frequency offset at each downstream transmitter and receiver is minimized, which minimizes the resynchronization time for each transmitter and receiver and the overall recovery time of the system. The present invention achieves this object with minimal additional circuitry, and in half the recovery time required by known digital microwave radio systems.

It is also an object of the present invention to provide a method and system that minimizes resynchronization time in a digital microwave radio system after the loss of an encrypted signal.

BRIEF DESCRIPTION OF THE DRAWINGS

Other objects and advantages are apparent and best understood by reference to the following description of illustrative embodiments when read in conjunction with the accompanying drawings, wherein:

FIG. 2 shows in more detail an exemplary transmitter-receiver section in the digital microwave radio system of FIG. 1;

FIG. 3 shows a block diagram of an elastic buffer used in each transmitter in the digital microwave radio system of FIG. 1;

DETAILED DESCRIPTION OF THE INVENTION

Figure 1:
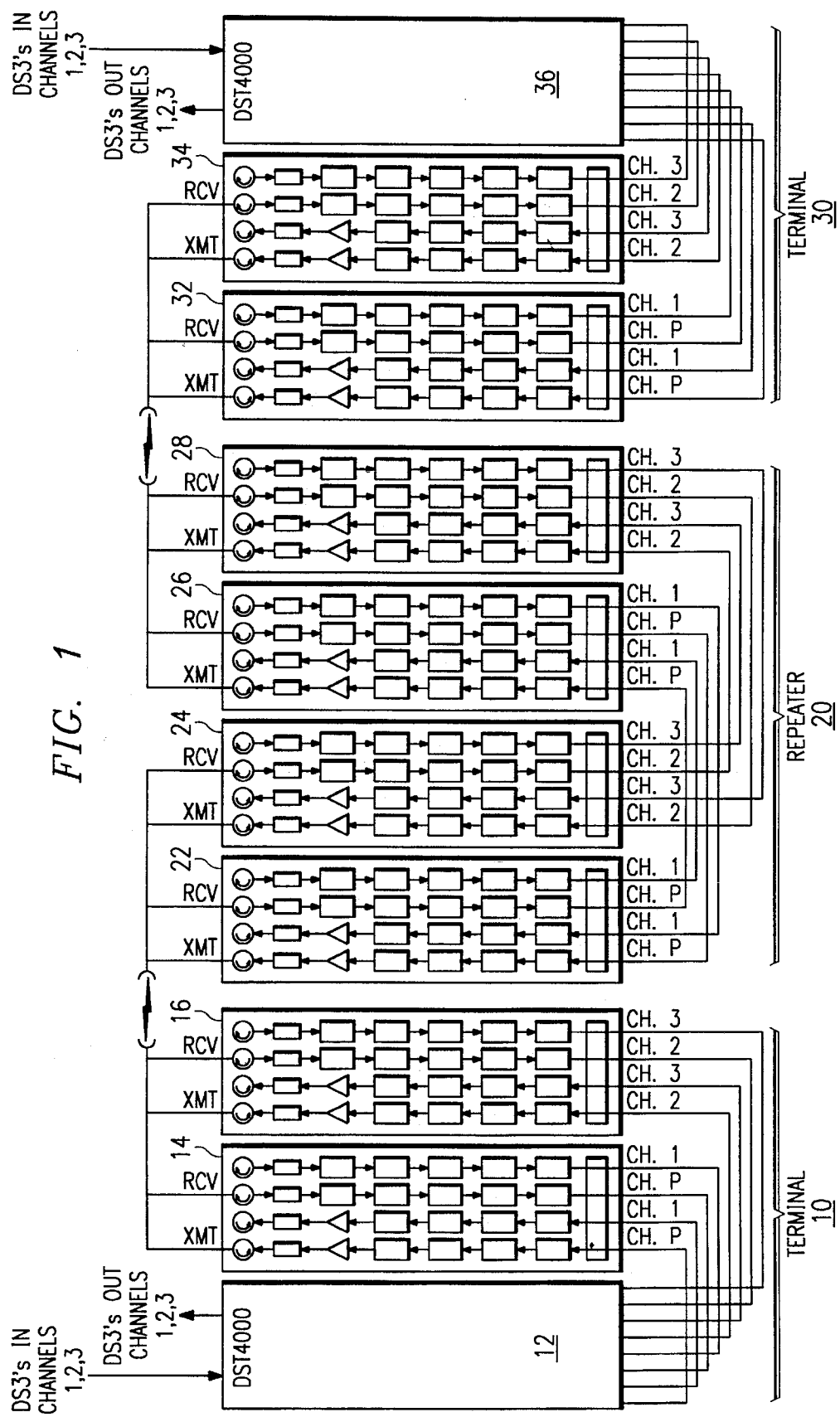
FIG. 1, shows a block diagram of a multiple hop, multiline digital microwave radio system.

In FIG. 1, a multiple hop, multiline digital microwave radio system is shown that includes digital switching terminals 10 and 30, and repeater 20. Terminals 10 and 30 are defined as originating terminals, because the communications channels may transport signals in both directions in FIG. 1. The system shown in FIG. 1 represents a two hop system. However, the number of hops may be increased by inserting additional repeaters and/or "add/drop" terminals that are identical in structure and operation to repeater 20, between terminals 10 and 30. Terminal 10 includes switching section 12, and transmitter-receiver sections 14 and 16. Switching section 12 routes incoming and outgoing communications signals to or from the respective transmitter and receiver channels in sections 14 and 16. Switching segment 12 is shown as a DST 4000, which is manufactured by Alcatel Network Systems, Inc. However, any known digital switching terminal having similar functional capabilities may be substituted for the DST 4000 shown in FIG. 1. It is understood that terminals 10 and 30 are shown identical in structure and operation, except for their placement in the system of FIG. 1. Furthermore, transmitter-receiver sections 14, 16, 22, 24, 26, 28, 32 and 34 are shown identical in structure and operation, with each such section also including a receive elastic buffer and a transmit elastic buffer in a known configuration, although each such elastic buffer is not explicitly shown in FIG. 1.

Standard communications signals in a DS3 format are coupled to and from the respective channel input and output connections of switching sections 12 and 36. However, other valid communications signals such as, for example, signals in the European E3 format, may be transported by the system of FIG. 1. The signals input to switching section 12 are routed to respective channels 1–3, or if desired, to protection channel p in the transmitters of sections 14 and 16. Conversely, the signals from channels 1–3 or p in the receivers are routed to the output connections of switching section 12.

In FIG. 2, exemplary transmitter-receiver section 16 of FIG. 1 is shown in more detail. As discussed above, the structure and operation of transmitter-receiver section 16 is well-known and identical to that of each transmitter-receiver section shown in FIG. 1. Therefore, the following description of transmitter-receiver section 16 applies equally to each transmitter-receiver section in FIG. 1. The DS3 signals input to transmit channel 2 are coupled through a line build out (LBO) section to simulate a required length of cable. The DS3 signal is then coupled to a line receiver (not explicitly shown) in input conditioner 40. The line receiver recovers the data and clock pulses from the incoming DS3 signal. The recovered data and clock pulses are coupled to the data and clock inputs at the write side of transmit elastic buffer 2 (to be described in detail below). Consequently, the incoming DS3 data are written into elastic buffer 2 at the incoming clock rate. A clock pulse from the radio frame multiplexer (not explicitly shown) in input conditioner 40 is coupled to the read side of transmit elastic buffer 2, in order to clock out the data from the elastic buffer at the radio data rate. The data signal output from transmit elastic buffer 2 is clocked by the radio frame multiplexer, at a rate which is digitally controlled to match the incoming DS3 clock rate. In modulator 42, the multiplexer output signals are quadrature amplitude modulated onto an IF subcarrier. The IF signals from modulator 42 are then coupled to up converter 44, where the IF subcarrier is converted to the nominal transmit radio frequency. The RF signals are then amplified in power amplifier 46, filtered at block 48, and coupled through circulator 50 for transmission from antenna 52. The channel 3 DS3 signals are processed through a separate transmit channel that is identical in structure and operation to transmit channel 2. The channel 2 DS3 signals received by antenna 52 are filtered, down-converted and demodulated in respective blocks 56, 58 and 62 in a known manner and coupled to output conditioner 64. The clock signal at the read side of receive elastic buffer 6 is coupled to a smoothing phase-lock loop (not explicitly shown) in output conditioner 64, to effectively control smoothing of the DS3 data signal from receive elastic buffer 6 and minimize frequency errors at the output of receive channel 2. Again, the structure and operation of receive channel 3 in FIG. 2 is identical to that of receive channel 2, to include receive elastic buffer 8.

In FIG. 3, an exemplary transmit elastic buffer is shown, which may represent either of transmit elastic buffers 2 or 4 in FIG. 2. As mentioned earlier, the structure and operation of an elastic buffer is well-known. However, a brief description of an exemplary transmit elastic buffer is provided to aid in understanding its use in conjunction with the present invention. The recovered DS3 input signal from the line receiver in the transmit input conditioner is coupled to the input of write demultiplexer 64, which converts the serial input data to parallel data. The recovered DS3 clock signal is coupled to the clock inputs of 4 bit counter 62 and 16 bit register 66. Counter 62 selects one of the outputs of write demultiplexer 64 to be clocked into the corresponding cell of register 66. Although register 66 is shown as a 16 bit register, any size register may be substituted for register 66 as a design choice. At the read side of the elastic buffer, the 16 bit output from register 66 is coupled to the input of multiplexer 68. Multiplexer 68 converts the 16 bit data from register 66 into serial data. The radio frame multiplexer clock signal is coupled to the clock inputs of 4 bit counter 70 and flip-flop 72. Four bit counter 70 selects which cell of register 66 is presented at the output of multiplexer 68. The serial data at the output of multiplexer 68 is clocked into flip-flop 72 at the radio data clock rate. The data signal from flip-flop 72 is coupled to a succeeding stage in input conditioner 40. Therefore, the input data signal from switching terminal 12 in FIG. 1 is written into the transmit elastic buffer at the DS3 clock rate and read out at the radio data clock rate. The read and write selections used in conjunction with the elastic buffer may be accomplished by various devices, such as, for example, a shift regulator for a logic state sequencer. So, the elastic buffer functions to compensate for the different transmission rates by "taking up the slack" in register 66. A signal degradation such as a loss of signal or an out-of-specification signal in a transmit channel is indicated whenever the read and write counts of the elastic buffer become equal or, in other words, whenever the buffer is reading and writing simultaneously from the same bit position in the register. This condition is defined as a "buffer spill".

Figure 4:
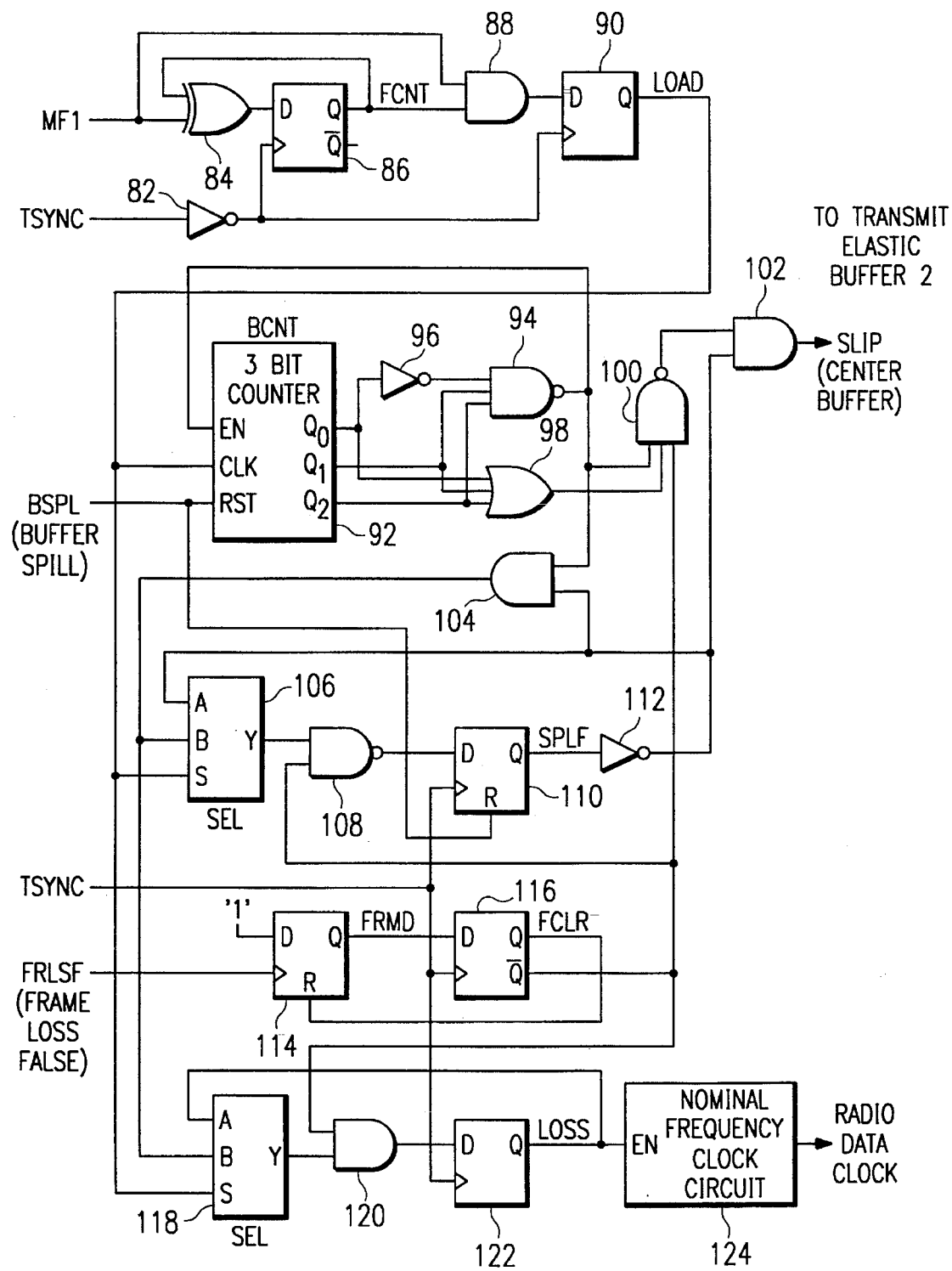
FIG. 4 shows a schematic circuit diagram of the preferred embodiment.

In FIG. 4, the preferred embodiment is shown in a simplified logic block diagram. Additional block diagrams showing the invention in greater detail are attached as part of this disclosure in Appendix A. Referring to FIG. 4, the multiframe clock signal MF1 is coupled to an input of exclusive OR gate 84 and AND gate 88. The output of gate 84 is connected to the D input of flip-flop 86. The Q output of flip-flop 86 is connected to the second inputs of AND gate 88 and exclusive OR gate 84. The output of AND gate 88 is connected to the D input of flip-flop 90. The transmit synchronization clock signal TSYNC is coupled to the input of inverter 82. The TSYNC signal pulse occurs at the system's frame rate. The MF1 signal is set "high", for the first of eight TSYNC periods or the first of eight frames in the system clock cycle. The inverted signal from inverter 82 is then coupled to the clock inputs of flip-flops 86 and 90. The Q output of flip-flop 90 generates the LOAD pulse, which is coupled to the clock input of 3-bit BCNT counter 92, the select input of multiplexer 106, and the select input of multiplexer 118.

The buffer spill indication signal BSPL is coupled to the reset inputs of 3-bit counter 92 and flip-flop 110. The Q0 output of 3-bit counter 92 is connected to the input of inverter 96 and one input of OR gate 98. The output of inverter 96 is connected to an input of NAND gate 94. The Q1 output of 3-bit counter 92 is connected to the second inputs of NAND gate 94 and OR gate 98, while the Q2 output is connected to the third inputs of gates 94 and 98. The negated output of NAND gate 94 is connected to the enable input of 3-bit BCNT counter 92, an input of NAND gate 100, and an input of AND gate 104. This output is set "low" when the output of 3-bit BCNT counter 92 is equal to six (6). Three-bit BCNT counter 92 represents a greater than 5 millisecond timer. The output of OR gate 98 is connected to the second input of NAND gate 100. The output of AND gate 104 is connected to the B inputs of multiplexers 106 and 118. The Y output of multiplexer 106 is connected to an input of NAND gate 108. The negated output of gate 108 is connected to the D input of flip-flop 110. The Q output of flip-flop 110 is connected to the input of inverter 112. The output of inverter 112 is connected to the A input of multiplexer 106, and the second inputs of AND gates 102 and 104. The TSYNC clock signal is also coupled to the clock inputs of flip-flops 110, 116 and 122. The frame loss false signal FRLSF is coupled to the clock input of flip-flop 114. The FRLSF signal is normally "high" and changes to "low" when there is a loss of frame. The D input of flip-flop 114 is held "high" by inputting a binary "1". The Q output of flip-flop 114 is connected to the D input of flip-flop 116. The Q output of flip-flop 116 is the frame clear signal FCLR, which is "high" for one TSYNC cycle when an out-of-frame to in-frame transition is detected. The Q output of flip-flop 16 is connected to the reset input of flip-flop 114, while the Q̄ output is connected to an input of AND gate 120, the second input of NAND gate 108, and the third input of NAND gate 100. The Y output of multiplexer 118 is connected to the second input of AND gate 120. The output of AND gate 120 is connected to the D input of flip-flop 122, and the Q output of flip-flop 122 is connected to the A input of multiplexer 118, and the enable input of nominal frequency clock circuit 124. The Q output of flip-flop 122 is the LOSS signal, which is set "high" when a signal degradation is detected, by a buffer spill. The output of AND gate 102 is connected to the read and write counters in the transmit elastic buffer of FIG. 3, to set the counters to a nominal offset or, for example, to center the buffer.

Figure 5:
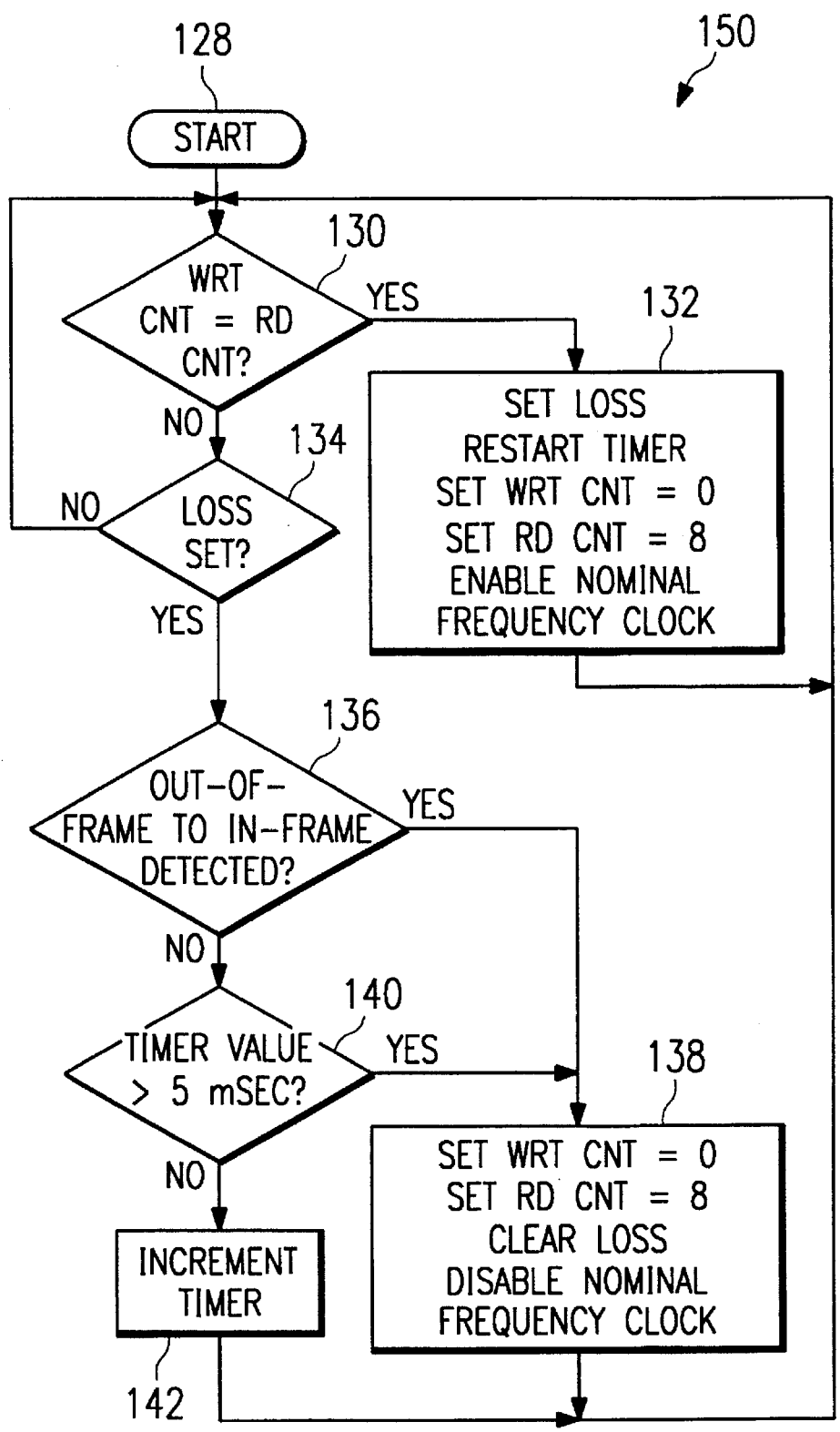
FIG. 5 provides a flow chart of the method of the preferred embodiment.

In FIG. 5, flow chart 150 describes the steps and functions of the preferred embodiment of the present invention. Beginning at start step 128, the method is first to query, as query block 130 indicates, whether the write count at the transmit elastic buffer is equal to the read count. For the exemplary transmit elastic buffer shown in FIG. 3, the step is to query whether the write count in 4-bit counter 62 equals the read count in 4-bit counter 70. If the write count equals the read count, it means that the counters are reading and writing simultaneously from the same location in the elastic buffer's register. As mentioned earlier, this event is defined as a "buffer spill". Whenever a buffer spill occurs, it is assumed that the data signal is either lost or has gone out-of-specification. Nevertheless, the present invention is not intended to be limited to a detection of a buffer spill at block 130. Any indication of an excessive frequency difference between the incoming signal and its nominal rate may be substituted for the functional concept determined by block 130.

In the event of a buffer spill, the flow proceeds to block 132 where the method accomplishes the function of enabling the nominal frequency clock, such as, for example, nominal frequency clock circuit 124 in FIG. 4. When enabled, the nominal frequency clock is used as the radio data clock to control the output data rates of the transmitter. The transmit elastic buffer's counters are set to a nominal offset by, for example, setting the transmit elastic buffer's write count equal to zero (0) and the read count equal to eight (8). This eight bit difference is the average or nominal offset for a sixteen bit elastic buffer. If another size register were to be used in the elastic buffer, such as, for example, an eight bit register, then the nominal offset would be equal to one half the register size, or 4 bits for the eight bit register. Also at block 132, a LOSS indicator is set and a timer (BCNT) is set to zero (0). The LOSS signal indicates a degradation of the clock signal recovered by the line receiver in the transmit input conditioner. The flow then proceeds back to block 130. If, at block 130, there is no indication of a buffer spill, then flow proceeds to block 134. At block 134, a query is made about whether or not the LOSS indicator is set. If not, the flow proceeds back to block 130 to await a buffer spill. If, at block 134, the LOSS indicator is set, then flow proceeds to block 136.

At block 136, a query is made about whether or not an out-of-frame to in-frame condition has been detected at the transmitter. This occurrence means that there has been a loss of frame and subsequent return of frame. With such an occurrence, it is assumed that an in-specification signal is now present at the transmitter, and normal operation may be resumed. If so, then flow proceeds to block 138, where the transmit elastic buffer's counters are again set to a nominal offset. The LOSS indicator is then cleared, and the nominal frequency clock circuit is disabled. The flow then proceeds back to block 130 to await a buffer spill.

Conversely, at block 136, if an out-of-frame to in-frame condition has not been detected at the transmitter, then flow proceeds to block 140. At block 140, a query is made about whether the elapsed time since the buffer spill occurred is greater than a predetermined amount of time, such as, for example, 5 milliseconds in the preferred embodiment. This period determines the frequency deviation limits of an in-specification signal. As a matter of design choice, it is assumed that an in-specification signal is present at the transmitter if no buffer spill has occurred during this period. If no buffer spill has occurred, then flow goes to block 138, where the method sets the transmit elastic buffer's counters to an offset, the LOSS indicator is cleared, and the nominal frequency clock circuit is disabled. Flow then goes back to block 130.

However, at block 140, if the elapsed time since the last buffer spill is not greater than the predetermined period, then the timer is incremented and flow then goes back to block 130 to proceed as previously described.

OPERATION

Figure 6:
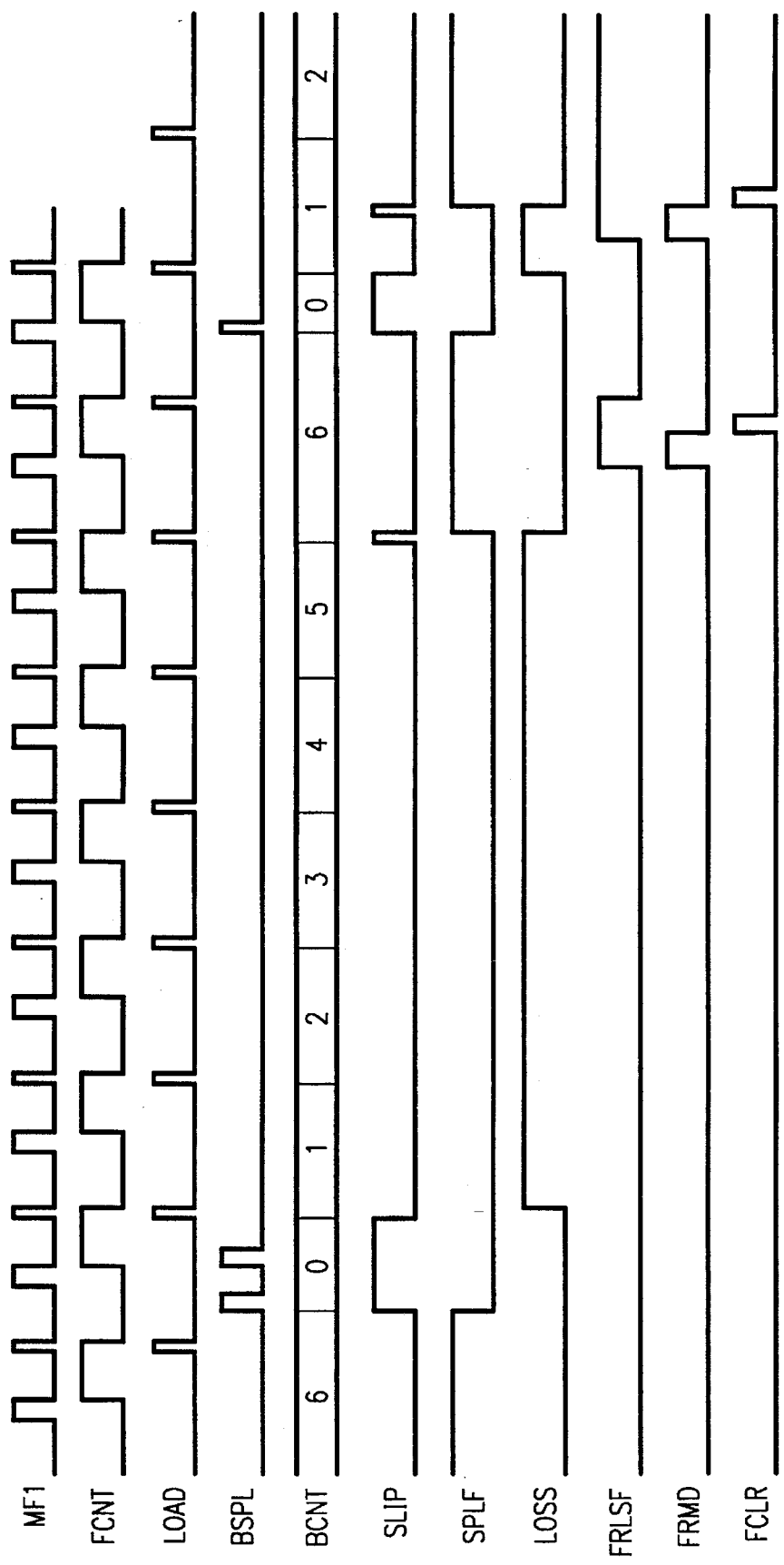
FIG. 6 shows a timing diagram of the waveforms resulting from implementing the preferred embodiment.

Having explained generally the structure and processes of the preferred embodiment, the following description shows how the preferred embodiment that, upon determining that a buffer spill has occurred, decides whether or not to enable nominal frequency clock circuit 124 shown in FIG. 4. FIG. 6, read in conjunction with FIGS. 4 and 5, generally shows the waveforms resulting from the operation of the preferred embodiment. A detailed description of an algorithm written in a well-known hardware design language ("HDL"), which was used to fabricate the logic shown in FIG. 4, is attached as part of this disclosure at Appendix B.

The multiframe synchronization pulse MF1, which is operating at 2 kHz, is applied to an input of exclusive OR gate 84. By the operation of exclusive OR gate 84 and flip-flop 86 being clocked at the transmitter radio synchronization TSYNC rate, the frame count pulse FCNT is alternately set "high" and "low" at the trailing edge of the multiframe pulse. Thus, the FCNT pulse is set "high" between every other multiframe pulse, and synchronized with the radio rate. The FCNT pulse is ANDed with the MF1 pulse by the operation of AND gate 88, and the resulting pulse is clocked out of flip-flop 90 at the TSYNC radio rate. Consequently, the LOAD pulse is generated at the Q output of flip-flop 90 at the rate of one LOAD pulse for every two MF1 multiframe pulses, with the duration of each LOAD pulse equal to one TSYNC period.

The LOAD pulse is used as the clock pulse for 3 bit counter 92. At the onset of a buffer spill at transmit elastic buffer 2 in FIG. 3, buffer spill pulse BSPL is coupled to the asynchronous reset input of 3 bit counter 92. When the BSPL pulse input is cleared, counter 92 starts counting at the LOAD pulse rate. By the operation of inverter 96 and NAND gate 94, the block count BCNT stops when a count of six (6) is reached. The BCNT is then set to zero (0).

Additionally, at the onset of a buffer spill, the BSPL pulse resets flip-flop 110, which enables AND gate 102. Since BCNT has also been set to zero (0), a SLIP signal is generated through OR gate 98, NAND gate 100, and AND gate 102, to center the transmit elastic buffer. Once the BCNT increments out of the zero (0) state, the SLIP signal at the output of AND gate 102 is cleared.

By resetting flip-flop 110, the spill false signal SPLF is set "low". If BCNT is not equal to six (6), and LOAD is "high", then the Q output of flip-flop 122 (LOSS) is set "high" on the leading edge of the TSYNC pulse. This output (LOSS) enables the nominal frequency clock circuit 124.

If no buffer spill occurs by the time BCNT reaches six (6), NAND gate 94 goes "low" which generates a SLIP pulse at the output of AND gate 102, to center the transmit elastic buffer. When the LOAD pulse is set "high", and BCNT is equal to six (6), the spill false signal SPLF is set "high" and the SLIP pulse is cleared at the output of AND gate 102. Also, the LOSS signal is set "low", which disables the nominal frequency clock circuit 124.

If the frame loss false signal FRLSF transitions from "low" to "high", flip-flop 114 is set "high". The Q output of flip-flop 114 is clocked into flip-flop 116 at the TSYNC rate. The Q output of flip-flop 116 resets flip-flop 114. This action generates a frame clear pulse FCLR, which generates a SLIP signal, sets the spill false signal SPLF "high" and sets the LOSS signal "low" which disables nominal frequency clock circuit 124. This occurrence represents an out-of-frame to in-frame detection shown in block 136 in FIG. 5.

In summary, the invention provides a method and system for minimizing resynchronization delays in a digital microwave radio system by, immediately upon detecting a signal degradation such as a loss of signal or an out-of-specification signal at any one of a series of digital microwave radio transmitters, setting the transmitter's elastic buffer to an average condition and thereby minimizing frequency offsets at all downstream transmitters and receivers during the degradation period.

As a result of the above, although the invention has been described with reference to the above embodiments, its description is not meant to be construed in a limiting sense. Various modifications of the disclosed embodiment, as well as alternative embodiments of the invention will become apparent to persons skilled in the art upon reference to the above description. It is therefore contemplated that the appended claims will cover such modifications that fall within the true scope of the invention.

APPEXNDIX A
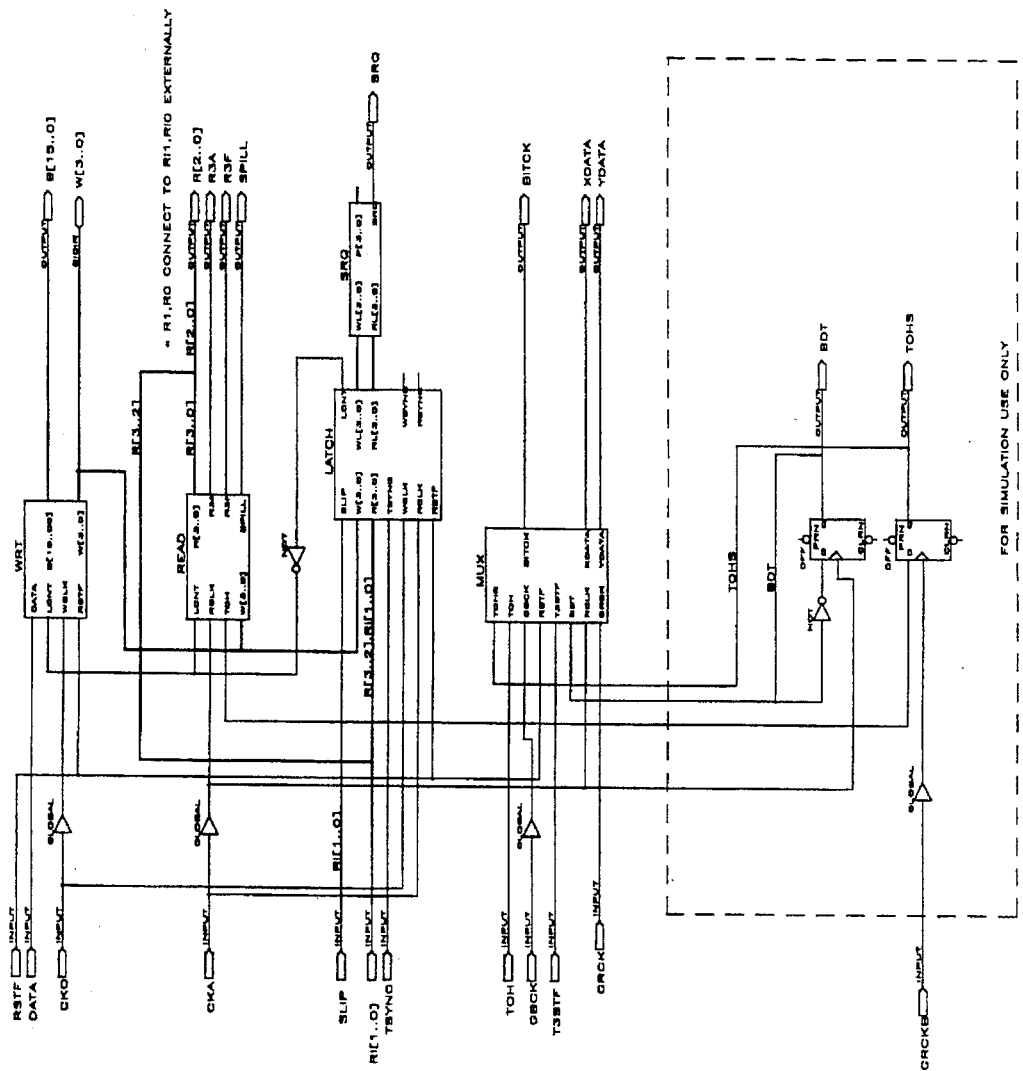

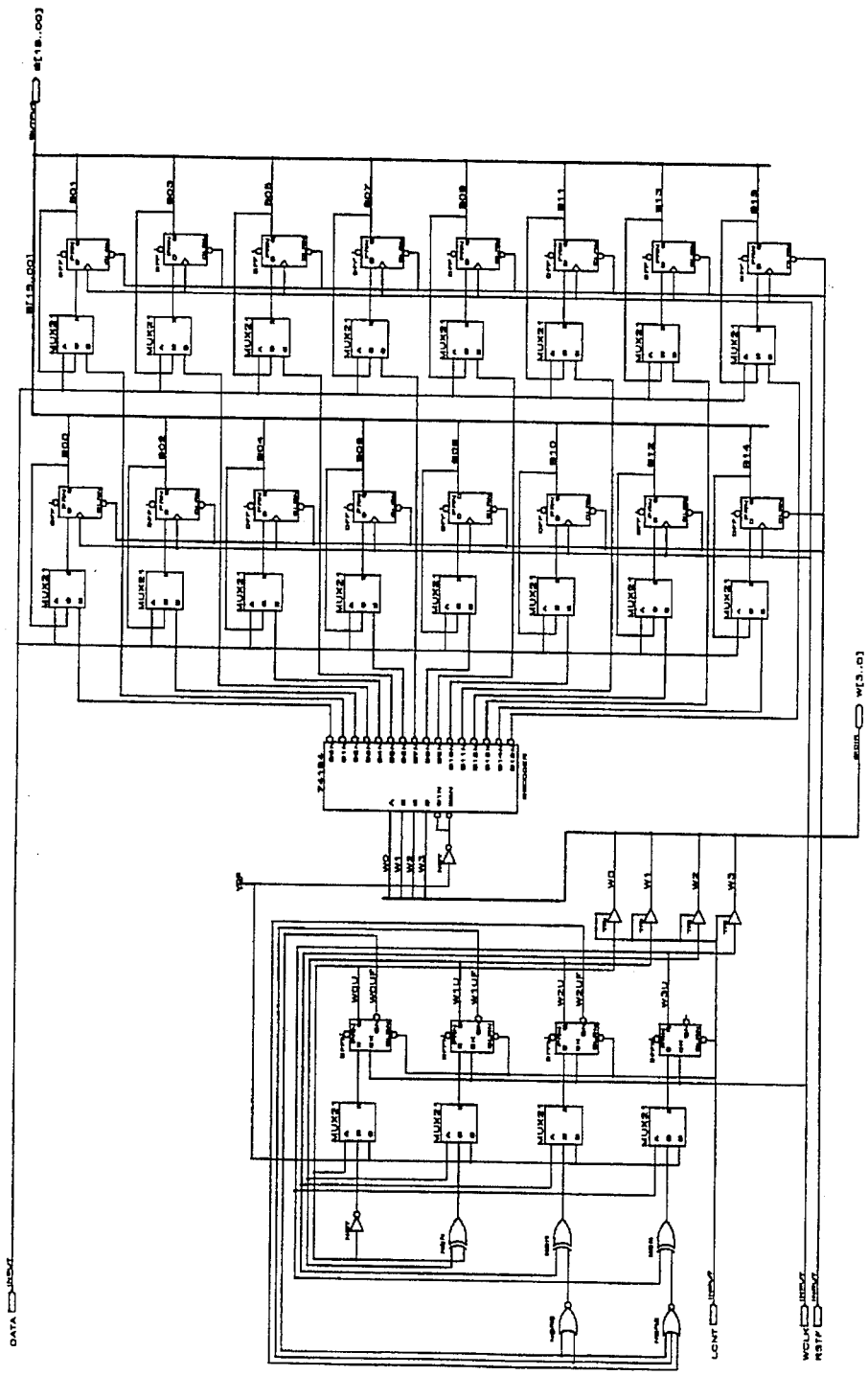

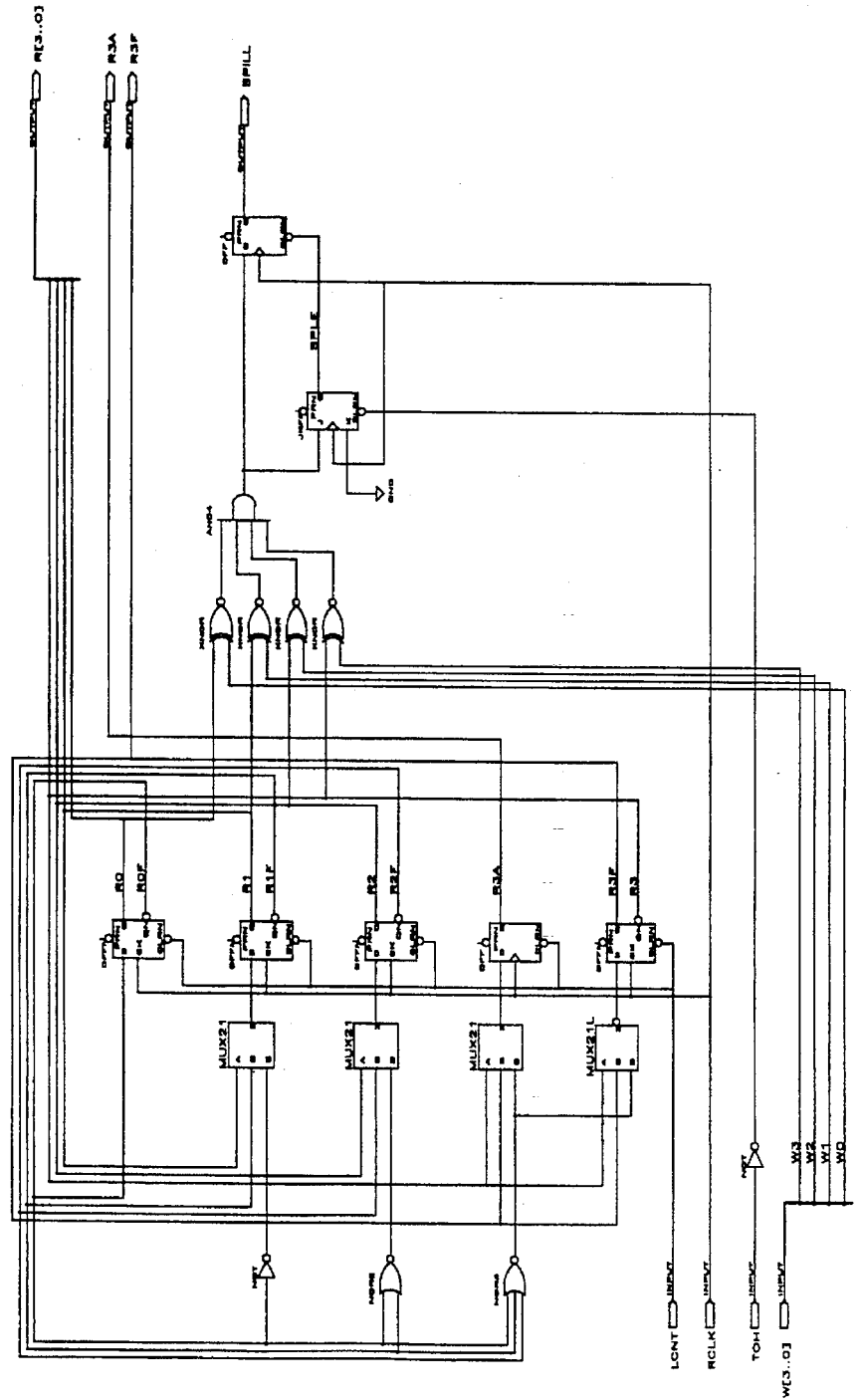

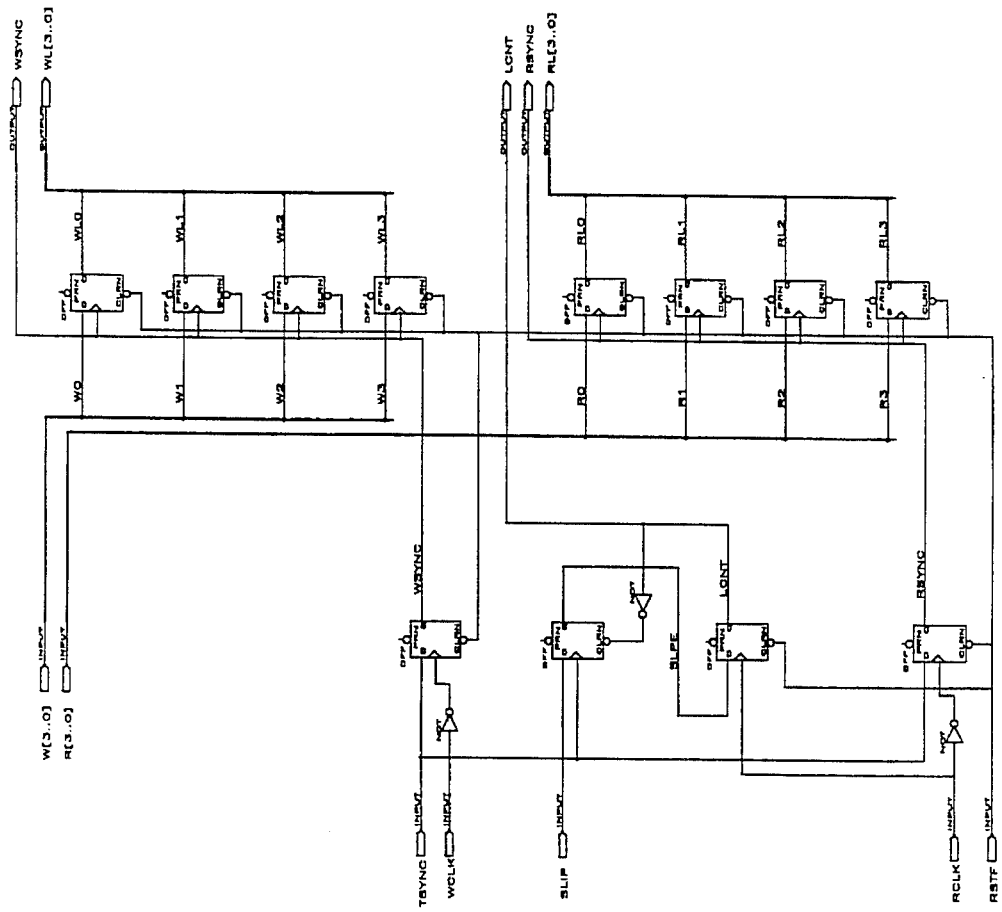

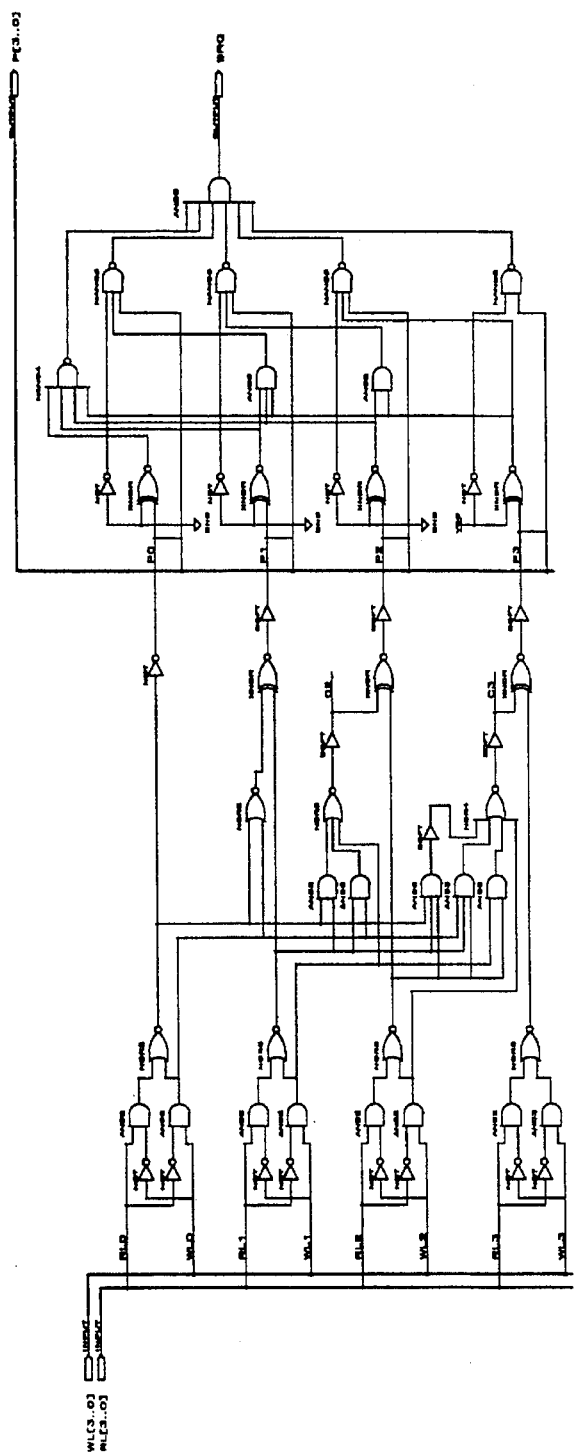

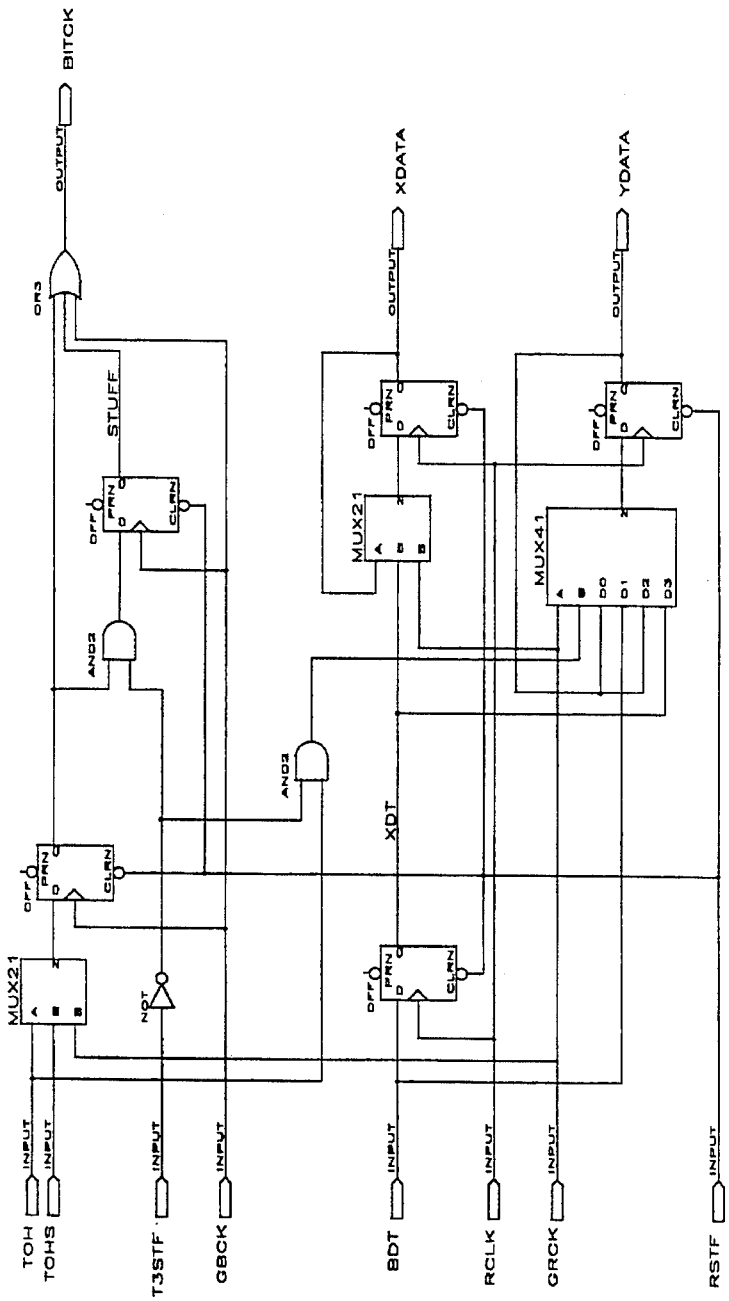

APPENDIX B

```
%**********************************************************
%*
%* CKDT - CLOCK FREQUENCY DETECTOR
%*
%********************************************************** subdesign CKDT
(
    TSYNC       : INPUT;
    BSPL        : INPUT;
    MF1         : INPUT;
    FRLSF       : INPUT;
    RSTF        : INPUT;
    LOSS        : OUTPUT;
    SLIP        : OUTPUT;
)

variable
    '1',        :NODE;
    '0'         :NODE;

FERR        :NODE;

LOAD        :DFF;
    FRMD        :DFF;
    FCLR        :DFF;
    FCNT        :DFF;
    SPLF        :DFF;
    BCNT[2..0]  :DFF;
    CKLOSS      :DFF;

begin
    '1' = VCC;
    '0' = GND;

%   define load pulse %

FCNT.clk = !TSYNC;
    FCNT.clrn = RSTF;

LOAD.clk = !TSYNC;
    LOAD.clrn = RSTF;

if MF1 then
        FCNT = !FCNT;
    else
        FCNT = FCNT;
    end if;

LOAD = MF1 and FCNT;
```

```
% define frame detect %

FRMD.clk = FRLSF;
    FRMD.clrn = !FCLR;

FCLR.clk = TSYNC;
    FCLR.clrn = RSTF;

FRMD = '1';
    FCLR = FRMD;              % clear LOSS when frame loss clears %

% define buffer spill counter %

BCNT[].clk = LOAD;
    BCNT[].clrn = !BSPL;

if (BCNT[] < 6) then
        BCNT[].= BCNT[] + 1;
    else
        BCNT[] = BCNT[];
    end if;

FERR = !SPLF and !(BCNT[] >= 6);

% define spill detect %

SPLF.clk = TSYNC;
    SPLF.clrn = !BSPL;

if FCLR then
        SPLF = '1';
    elsif LOAD then
        SPLF = !FERR;
    else
        SPLF = SPLF;
    end if;

% Define buffer sync enable %

SLIP = !SPLF and ((BCNT[] == 0) or !FERR or FCLR);

% define CKLOSS %

CKLOSS.clk = TSYNC;
    CKLOSS.clrn = RSTF;

if FCLR then
        CKLOSS = '0';
    elsif LOAD then
        CKLOSS = FERR;
    else
```

```
        CKLOSS = CKLOSS;
   end if;
   LOSS = CKLOSS;
end;
```

```
DESIGN IS "BXZS"
BEGIN
  DEVICE "BXZS" IS "EP1810LC-20T"
  BEGIN
    FRLSF            @ 14  : INPUT ;
    BSPL             @ 15  : INPUT ;
    MF1              @ 16  : INPUT ;
    TSYNC            @ 17  : INPUT ;
    REF1A            @ 19  : INPUT ;
    REF1B            @ 20  : INPUT ;
    REF2A            @ 21  : INPUT ;
    REF2B            @ 22  : INPUT ;

NAFR             @ 48  : INPUT ;
    DAN              @ 49  : INPUT ;
    DAP              @ 50  : INPUT ;
    CKA              @ 51  : INPUT ;
    CKA              @ 53  : INPUT ;
    RSTF             @ 54  : INPUT ;

|PHDT:20|S1A     @ MC1  : BURIED ;
    |PHDT:20|S1B     @ MC2  : BURIED ;
    PD1A             @ 4    : OUTPUT ;
    PD1B             @ 5    : OUTPUT ;
    |PHDT:20|S2A     @ MC5  : BURIED ;
    |PHDT:20|S2B     @ MC6  : BURIED ;
    PD2A             @ 8    : OUTPUT ;
    PD2B             @ 9    : OUTPUT ;

|DECODE:9|BPV    @ MC25 : BURIED ;
    |DECODE:9|P      @ MC26 : BURIED ;
    |DECODE:9|Q1     @ MC27 : BURIED ;
    |DECODE:9|Q2     @ MC28 : BURIED ;
    |DECODE:9|Q3     @ MC29 : BURIED ;
    |DECODE:9|RDAT   @ MC30 : BURIED ;
    |DECODE:9|DP     @ MC31 : BURIED ;
    |DECODE:9|DN     @ MC32 : BURIED ;
    CK               @ 44   : OUTPUT ;
    DT               @ 45   : OUTPUT ;

LOSS             @ 57   : OUTPUT ;
    SLIP             @ 58   : OUTPUT ;
    |CKDT:2|SPLF     @ MC40 : BURIED ;
    |CKDT:2|BCNT0    @ MC41 : BURIED ;
    |CKDT:2|BCNT1    @ MC42 : BURIED ;
    |CKDT:2|BCNT2    @ MC43 : BURIED ;
    |CKDT:2|FRMD     @ MC45 : BURIED ;
    |CKDT:2|FCLR     @ MC46 : BURIED ;
    |CKDT:2|FCNT     @ MC47 : BURIED ;
    |CKDT:2|LOAD     @ MC48 : BURIED ;
END;
```

END;

What is claimed is:

1. A system for minimizing resynchronization delays in a digital microwave system, comprising:

a transmitter including a first elastic buffer;

a first circuit associated with said transmitter and operable to detect at least one of a loss of signal or an out-of-specification signal at said transmitter;

a second circuit connected to an output of said first circuit and operable to set an average condition in said first elastic buffer in response to a detection in said first circuit, said first elastic buffer providing a data signal to be transmitted from said transmitter;

a third circuit connected to said output of said first circuit and operable to cause said transmitter to transmit at a predetermined frequency in response to a detection in said first circuit;

at least one receiver located successively downstream of said transmitter, said receiver operable to receive said transmitted signal and to control the frequency error of said receiver in response to said signal.

2. The system of claim 1 wherein said third circuit is disabled if said at least one of a loss of signal or an out-of-specification signal has not been detected after a predetermined time.

3. The system of claim 1 wherein said third circuit is disabled upon detection of an out-of-frame to in-frame condition.

4. A system for minimizing receiver resynchronization delays in a digital microwave radio system, comprising:

a transmitter including a first elastic buffer;

a receiver including a second elastic buffer;

a first circuit associated with said first elastic buffer and operable to detect a buffer spill in said first elastic buffer;

a second circuit connected to an output of said first circuit and, in response to a detection in said first circuit, operable to set the read counter of said first elastic buffer to a first count and the write counter of said first elastic buffer to a second count, the difference between said first count and said second count being a predetermined value, said transmitter operable to transmit a signal having a nominal value data rate;

a third circuit connected to said output of said first circuit and operable to cause said transmitter to transmit at a predetermined frequency in response to a detection in said first circuit; and a fourth circuit associated with said second elastic buffer and, in combination with said second elastic buffer, operable to control the tuning of said receiver in response to the transmitted signal and minimize the frequency deviation from the nominal value at the output of said receiver.

5. The system of claim 4 wherein said third circuit is disabled if said buffer spill has not been detected after a predetermined time.

6. The system of claim 4 wherein said third circuit is disabled upon detection of an out-of-frame to in-frame condition.

7. A method for use in centering an elastic buffer in a digital microwave radio transmitter to minimize frequency offset during a signal degradation period, comprising the steps of:

detecting a signal degradation in the transmitter;

responsive to said detection, setting the read counter of the elastic buffer to a first count and the write counter of the elastic buffer to a second count, the difference between said first count and said second count being a predetermined value, which centers the elastic buffer during the signal degradation period;

enabling a first circuit to cause said transmitter to transmit at a predetermined frequency in response to said detection;

disabling said first circuit if said signal degradation has not been detected during a predetermined time.

8. The method of claim 7 wherein said disabling step further comprises the step of:

setting said read counter to said first count and said write counter to said second count if said signal degradation has not been detected after a predetermined time.

9. The method of claim 7 and further comprising the step of:

disabling said first circuit upon detection of an out-of-frame to in-frame condition.

10. The method of claim 7 wherein said predetermined time is 5 milliseconds.

11. A digital microwave radio transmitter, comprising:

an elastic buffer;

a first circuit associated with said transmitter and operable to detect degradation in an incoming signal;

a second circuit connected to an output of said first circuit and operable to set an average condition in said elastic buffer in response to a detection by said first circuit, said elastic buffer providing a signal to be transmitted from said transmitter; and a third circuit connected to said output of said first circuit and operable to cause said transmitter to transmit at a predetermined frequency in response to a detection in said first circuit.

12. The transmitter of claim 11 wherein said third circuit is disabled if said degradation has not been detected after a predetermined time.

13. The system of claim 11 wherein said third circuit is disabled upon detection of an out-of-frame to in-frame condition.

* * * * *